United States Patent [19]

Yamagami

[11] Patent Number: 5,216,518
[45] Date of Patent: Jun. 1, 1993

[54] IMAGE PROCESSING METHOD AND APPARATUS FOR ENCODING VARIABLE-LENGTH DATA

[75] Inventor: Taku Yamagami, Yokohama, Japan

[73] Assignee: Canon Kabushiki Kaisha, Tokyo, Japan

[21] Appl. No.: 753,660

[22] Filed: Aug. 30, 1991

[30] Foreign Application Priority Data

Sep. 4, 1990 [JP] Japan ................... 2-234985
Sep. 4, 1990 [JP] Japan ................... 2-234986
Nov. 5, 1990 [JP] Japan ................... 2-297073

[51] Int. Cl.⁵ .................................... H04N 7/137
[52] U.S. Cl. ......................... 358/426; 358/138; 358/133
[58] Field of Search ................... 358/133–138, 358/261.1–261.3, 426, 427; 382/56

[56] References Cited

U.S. PATENT DOCUMENTS

| 4,774,587 | 9/1988 | Schmitt | 358/260 |
| 4,802,005 | 1/1989 | Kondo | 358/138 |
| 4,807,028 | 2/1989 | Hatori et al. | 358/133 |
| 4,823,201 | 4/1989 | Simon et al. | 358/138 |
| 4,827,339 | 5/1989 | Wada et al. | 358/105 |
| 4,858,017 | 8/1989 | Torbey | 382/56 |
| 4,858,028 | 8/1989 | Okino | 368/335 |
| 4,982,282 | 1/1991 | Saito et al. | 358/133 |
| 5,032,927 | 7/1991 | Watanabe et al. | 358/335 |

FOREIGN PATENT DOCUMENTS

| 0336317 | 3/1989 | European Pat. Off. |
| 0323194 | 7/1989 | European Pat. Off. |
| 0380081 | 1/1990 | European Pat. Off. |
| 3933155 | 4/1990 | Fed. Rep. of Germany |
| 63-205644 | 8/1988 | Japan |
| 1-081583 | 3/1989 | Japan |
| 1-221989 | 9/1989 | Japan |
| 2-113684 | 4/1990 | Japan |
| 02156789 | 9/1990 | Japan |

Primary Examiner—Stephen Brinich
Attorney, Agent, or Firm—Fitzpatrick, Cella, Harper & Scinto

[57] ABSTRACT

An image processing apparatus comprising: a first coding device for coding input image data into code data having a variable length; a second coding device for coding code data having the variable length and coded by the first coding device into code data having a fixed length; and a memory for storing code data coded by the first coding device.

25 Claims, 12 Drawing Sheets

FIG. 11B
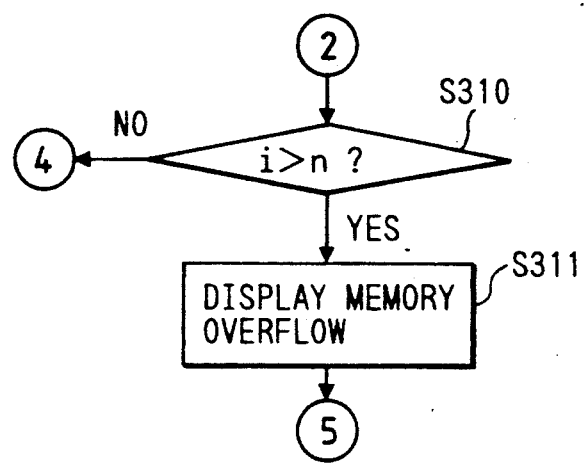
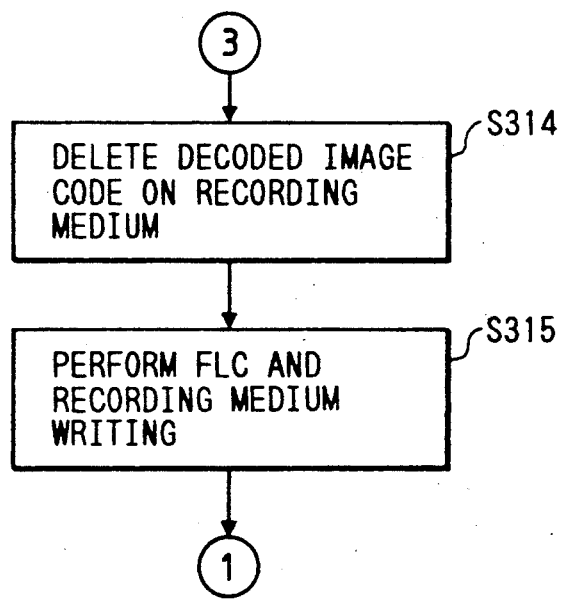

IMAGE PROCESSING METHOD AND APPARATUS FOR ENCODING VARIABLE-LENGTH DATA

BACKGROUND OF THE INVENTION

1. Field of the Invention

The present invention relates to a video signal recording apparatus for recording a video signal in such a manner that the video signal is compressed before it is recorded.

2. Related Background Art

Hitherto, an Adaptive Discrete Cosine Transform, (hereinafter abbreviated to "ADCT") method, for example, disclosed as in Document 1 (ISO/JTC1/SC2/WG8N800) has been known as an image compression method. According to the above-described method, a function is realized which is capable of, regardless of the image content, compressing an image signal into a predetermined amount of encoded data by a repetition process in which plural trial and error operations are performed. The adjustment function thus-realized will now be described.

According to the above-described method, the amount of data is, as disclosed in Document 1, converged by using a Newton Raphson Method or a method disclosed in Document 2 ("Method of Controlling Code Amount in DCT Coding", 1989, Autumn National Conference of the Electronic Information Society, p. 45, Exposition No. D45, Pre-Exposition Theses, disclosed by a group including Nemoto). Furthermore, the data amount has been desired to be converged at an even higher speed. For example, according to Document 2, two or three repetitions will cause an effect to be obtained in that the data amount can be compressed to a desired ratio while revealing an effect of reduction ratio of errors which is smaller than ±5%.

According to the ADCT method, the compression ratio (that is, the amount of encoded data) can be controlled by using parameter F for quantizing image data. FIGS. 3A and 3B illustrate the relationship between quantization parameter F and amounts of encoded data. As shown in FIG. 3, the compression ratio is a monotone decrease function of F. FIGS. 3A and 3B illustrate the relationship between F of various images and compression ratios. As can be seen from FIGS. 3A and 3B, although the relationship between F and the compression ratio depends upon the content of the image, the compression ratio necessarily becomes a monotone decrease function. Therefore, by performing plural trial and error operations while adjusting F, image data can be converged to a desired compression ratio (amount of encoded data).

As an example of hardware capable of performing the high speed DCT operations required to transform the frequency in accordance with the above-described ADCT method, A121 manufactured by INMOS or the like has been available. The IC employed in A121 is capable of executing the DCT operation for one frame at about 30 milliseconds. Assuming that operations (for example, zigzag scanning and Huffman coding) except for the DCT can be subjected to a parallel process, it takes 30 milliseconds or longer to perform one trial-and-error operation (that is, the compression ratio is obtained by performing the compression while giving F of a certain value). In a case where an image taken by the CCD of an electronic still camera is compressed by the ADCT method before it is recorded to a magnetic disk, a time about 40 milliseconds is actually required because the time to perform recording to the magnetic disk is furthermore taken.

On the other hand, if the amount of encoded data may be changed depending upon the image in a case where the ADCT method is employed, a method may be employed which is arranged in such a manner that the conversion of the data amount by the repetition process is not performed but the compression is performed while fixing F. In this case, recording of about 25 images per second can be enabled. As a result, satisfactory continuous photographing performance for an electronic still camera can be realized. However, a problem arises in that the number of images recordable in a memory having a certain capacity becomes indefinite because the amount of encoded data undesirably becomes variable in length.

In order to record a predetermined number of images, the amount of encoded data must be converged by plural repetition operations as described above. Assuming that three times of trial-and-error operations must be performed to converge the amount of encoded data, only about 8 images can be recorded in one second because a time of about 120 milliseconds is taken. Therefore, satisfactory continuous photographing performance for an electronic still camera cannot be realized as yet.

SUMMARY OF THE INVENTION

Accordingly, an object of the present invention is to provide an image processing apparatus capable of easily controlling the memory capacity.

Another object of the present invention is to provide a storage apparatus capable of efficiently storing image data.

In order to achieve the above-described objects, according to one aspect of the present invention, there is provided an image processing apparatus comprising: first coding means for coding input image data into code data having a variable length; second coding means for coding code data having the variable length and coded by the first coding means into code data having a fixed length; and memory means for storing code data coded by the first coding means.

Another object of the present invention is to select a proper coding method.

In order to achieve the above-described object, according to another aspect of the present invention, there is provided an image processing apparatus comprising: first coding means for coding input image data into code data having a variable length; second coding means for coding input data into code data having a fixed length; and selecting means for selecting the first or second coding means.

Another object of the present invention is to efficiently compress images of a plurality of frames.

In order to achieve the above-described object, according to another aspect of the present invention, there is provided an image processing method comprising the steps of: coding image data of the first frame into first code data having a variable length; coding image data of the second frame into second code data having a variable length; and coding the first and second code data into third code data having a fixed length.

Another object of the present invention is to provide a compressing method suitable for a still image recording apparatus.

In order to achieve the above-described object, according to another aspect of the present invention, there is provided a still image recording apparatus comprising: mode setting means for setting a single photographing mode or a continuous photographing mode; first coding means for coding into code data having a fixed length when the single photographing mode is set by the mode setting means; and second coding means for coding into code data having a variable length when the continuous photographing mode is set by the mode setting means.

Another object of the present invention is to accurately determine the parameter of coding.

In order to achieve the above-described object, according to another aspect of the present invention, there is provided an image processing apparatus comprising: input means for inputting image data; first control means for controlling the inputting condition of the input means; coding means for coding image data input by the input means; and second control means for controlling coding performed by the coding means in accordance with the inputting condition of the input means controlled by the control means.

Another object of the present invention is to determine the parameter of coding at high speed.

Other and further objects, features and advantages of the invention will appear more fully from the following description.

BRIEF DESCRIPTION OF THE DRAWINGS

FIGS. 11A and 11B are flow charts which illustrate the operation of a sixth embodiment of the present invention.

DETAILED DESCRIPTION OF THE PREFERRED EMBODIMENTS

First Embodiment

A digital camera according to the present invention is constituted as follows: a repetition process for converging the amount of encoded data is usually performed in a single photographing mode so as to perform so-called fixed length coding (hereinafter abbreviated to "FLC") while controlling the amount of encoded data. In a case where a user has selected a mode in which a plurality of image pictures are continuously recorded in response to a single depression of a button, the above-described repetition operation is not performed at the time of the photographing operation, but so-called variable length coding (hereinafter abbreviated to "VLC") in which the value of quantization parameter F is fixed is performed. As a result, the time taken to perform the coding process can be shortened for the purpose of increasing the number of images which can be continuously taken in a unit time. Furthermore, at the moment at which the above-described continuous photographing operation has been completed, the image recorded in accordance with VLC is temporarily decoded and re-encoded again encoded in accordance with FLC so that a predetermined number of images can be recorded on a recording medium having the same coding length.

Figure 2:
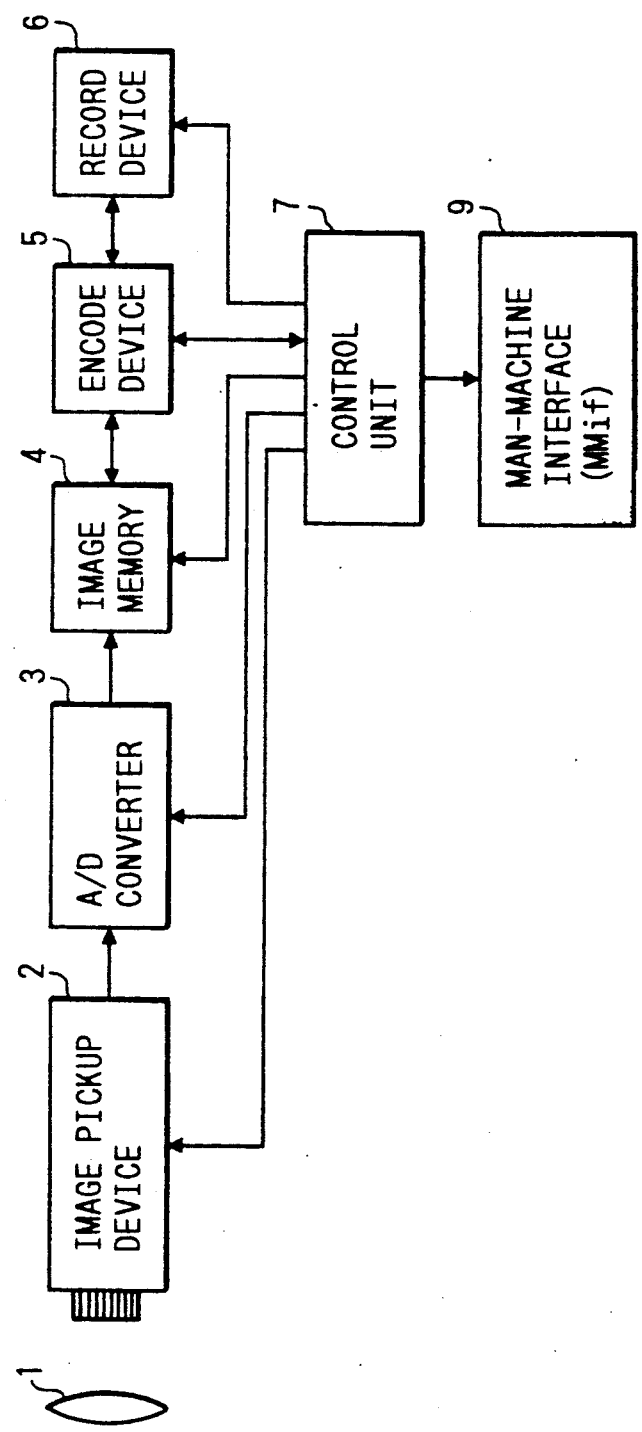
FIG. 2 is a block diagram which illustrates the first embodiment of the present invention.
Figure 3A:
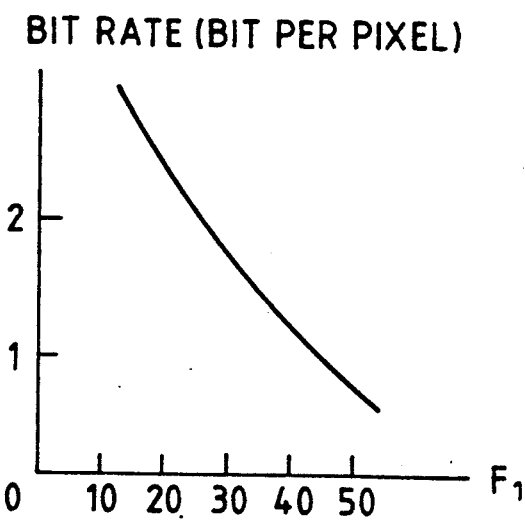
FIGS. 3A and 3B respectively illustrate the relationship between parameter F and the amounts of compression encoded data.
Figure 3B:
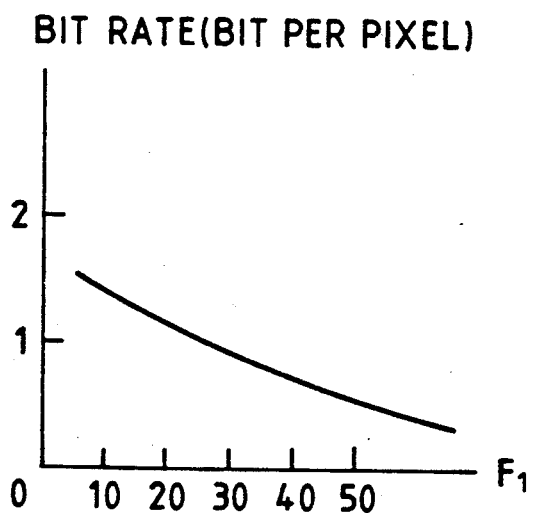

FIG. 2 illustrates an embodiment of the present invention, where portions of the camera which are not related to the present invention, for example, the diaphragm, the shutter and the like are omitted. Referring to FIG. 2, an optical image received by a lens 1 is converted into a video electric signal by an image pickup device 2, for example, a CCD (Charge Coupled Device). The image pickup device 2 registers charges, which correspond to the optical images of the subject and reads the video signal in response to a control signal supplied from a control unit 7.

The video signal thus-read is converted into a digital signal by an A/D converter 3. A video signal processing means is disposed between the image pickup device 2 and the A/D converter 3 although omitted from illustration so that the γ-correction process, the formation and separation of the color signal, the white balance process and, the conversion into Y-dicolor difference are performed.

The video signal converted into the digital signal is registered in an image memory 4.

An encode device 5 encodes image data read out from the image memory 4 in accordance with the above-described ADCT method so as to transmit the image data to a record device 6. The encode device 5 further possesses a function of counting the code data quantity and a function of decoding single encoded data. The counted amount of encoded data can be read out by a control unit 7.

The control unit 7 unifies the functions of the apparatus and controls the functions of the overall system. That is, the control unit 7 controls the sequential operations of the corresponding units such as the image pickup operation, registration and compression of data and recording medium recording. The control unit 7 further performs the file administration. An MMif 9 is an man-machine interface including a monitor for displaying the available quantity of the memory, the number of the recorded images, the number of the recordable images and the like, a release button and a variable operation member.

The structure of the encode device 5 will now be described with reference to FIG. 4.

Figure 4:
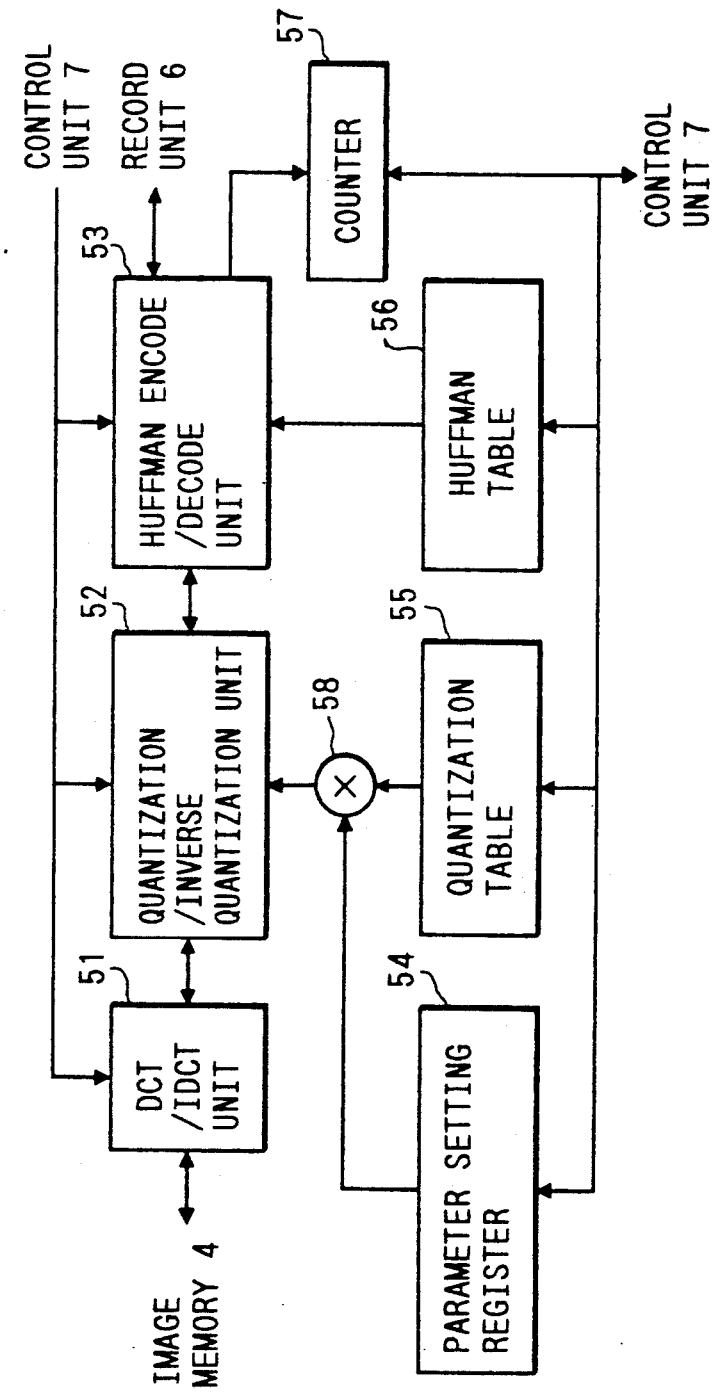
FIG. 4 illustrates the structure of a compression encoding portion 5.

Referring to FIG. 4, reference numeral 51 represents a DCT/IDCT unit for performing discrete cosine transform and inverse discrete cosine transform operations. Reference numeral 52 represents a quantization/inverse quantization unit for performing the quantization and the inverse quantization of data in accordance with a quantization parameter set by a quantization table 55. Reference numeral 53 represents a Huffman encode/decode unit for performing encoding/decoding in accordance with a parameter supplied from a Huffman table 56.

Reference numeral 54 represents a parameter setting register for registering data transmitted from the control unit 7 for the purpose of changing the quantization parameter stored in the quantization table 55, the data thus-registered being then transmitted by the parameter setting register 54 to a multiplier 58. Reference numeral 57 represents a counter for counting the amount of encoded data transmitted from the Huffman encode/decode unit 53. The control unit 7 calculates data to be set for the parameter setting register 54 in accordance with the count value made by the counter 57.

The above-described units described with reference to FIG. 4 are controlled by the control unit 7. At the time of the encode operation, video data transmitted from the image memory 4 is discrete-cosine-converted by the DCT/IDCT 51, quantized by the quantization-/inverse quantization unit 52 and Huffman-encoded by the Huffman encode/decode unit 53 before it is stored in the record device 6. Furthermore, in order to again perform encoding, encoded data stored in the record unit 6 is subjected to Huffman decoding, the inverse-quantization and the inverse DCT in the inverse sequential order to the above-described processes so that obtained image data is stored in the image memory 4.

In a case where an ordinary record mode has been selected by an operator through a mode switch provided in an operation unit (omitted from illustration), the control unit 7 performs recording by the following procedure.

When the release button is depressed, the control portion performs focusing and operates the diaphragm and the shutter so as to expose the image pickup device 2. As a result, image information is fetched by the image memory 4. The control unit 7 transmits the quantization parameter F to the encode device 5 so that image data stored in the image memory 4 is compressed and the amount of encoded data is counted. At this time, the encode device 5 does not transmit code data but the same counts the amount of encoded data for one frame.

The above-described operations are performed while changing F until a desired amount of encoded data can be obtained so that a plurality of trial-and-error operations are performed.

At the time when F (hereinafter designated by symbol "Fa"), which enables a desired amount of encoded data to be generated, is obtained, the control unit 7 again supplies the parameter Fa to the encode device 5 and instructs the record device 6 to transmit code data. The control unit 7 instructs the record device 6 to receive/record the code data.

As a result of the above-described operations, compression codes, which have been subjected to fixed length coding are recorded to the recording medium (for example, in IC card, a magnetic disk, an optomagnetic disk or the like) of the record device 6.

In a case where a user selects a continuous recording mode through the mode switch provided in the operation unit, the control unit 7 performs the recording operation as follows:

The operations from the moment at which the image pickup device 2 is exposed to light to the moment at which image information is fetched by the image memory 4 are the same as those to be performed in the ordinary recording mode. In the encoding process in this mode, fixed length coding of the amount of encoded data by means of the repetition process is not performed, but the encoding and recording are performed while fixing the value of F to a default value. That is, the control unit 7 supplies parameter F to the encode device 5 and as well as instructs the record device 6 to transmit code data. Furthermore, the control unit 7 instructs the record device 6 to receive the code data and to perform recording.

A relatively small value is selected as the value of the quantization parameter F at this time in order to prevent the image quality deterioration due to the compression (quantization).

As a result of the above-described operations, the variable length and compressed code is recorded to the record device. The recording process thus-arranged is continued for the period in which the release button is being depressed.

After the continuous photographing processes have been sequentially completed, all of code data items, which have been subjected to the variable length coding, are read out from the recording medium included in the record device 6. Then, the code data is decoded to pre-encoding image information by the encode device 5 before it is stored in the image memory 4.

Similarly to the encoding process, the above-described operations are controlled by the control unit 7. Information stored in the image memory 4 is compressed and recorded by the above-described ordinary process, that is, fixed length coding in which the repetition process is utilized.

Figure 1:
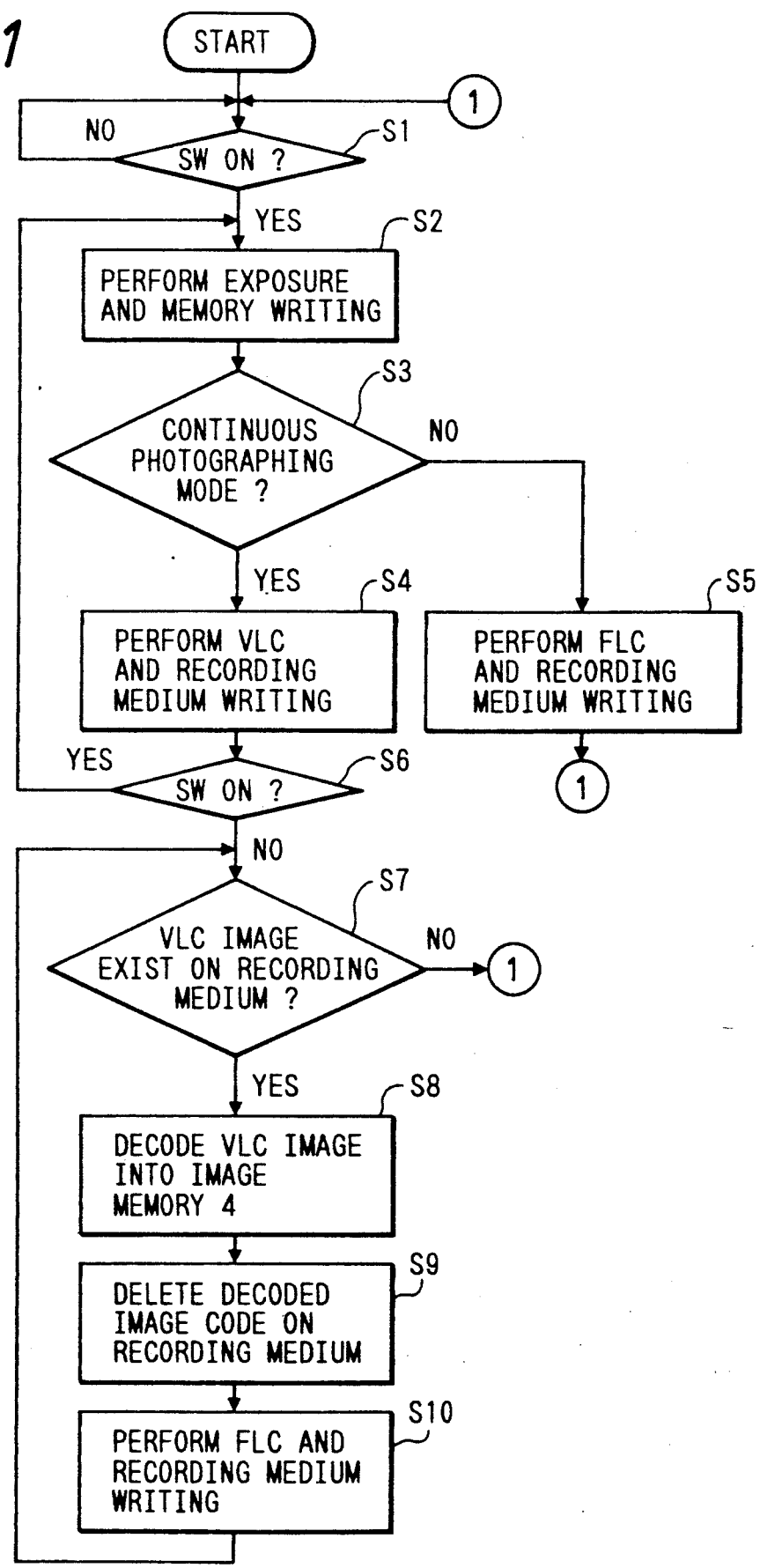
FIG. 1 is a flow chart which illustrates the operation of a first embodiment of the present invention.

A schematic flow chart of the above-described embodiment is shown in FIG. 1.

Referring to FIG. 1, depression of the release button is waited for in step S1. When it is depressed, exposure and memory writing are performed in step S2.

If it is, in step S3, determined that the continuous photographing mode has not been set, the FLC of image data on the image memory is performed and recording is performed in step S5.

If the continuous photographing mode has been set, the VLC of image data on the image memory is performed and recording is performed in step S4. If the release button is being depressed in step S6, the flow returns to step S2.

In a case where the release button is not depressed in step S6, that is, the continuous photographing has been completed, the flow proceeds to step S7 in which whether or not the image recorded by the VLC exists on the recording medium is examined. If it does not exist, the flow returns to the initial stage. If it exists, the flow proceeds to step S8 in which code data is read out from the recording medium before it is decoded so as to be stored in the image memory 4. In step S9, the code data decoded in step S8 and recorded on the image recording medium is deleted. In step S10, the image data in the image memory is subjected to the FLC before it is recorded. Then, the flow returns to step S7.

Second Embodiment

According to the above-described embodiment, in a case where an image, which has been subjected to the variable length coding process, exists, it is automatically searched and decoded to be re-encoded by the FLC. The above-described operation may be commenced by a user by using a switch. That is, a structure may be employed which is arranged in such a manner that the flow is able to enter the sequence of step S7 when a user switches on a switch which enables the variable length code arrangement to be performed.

According to the above-described embodiment, the first compression means for performing the variable length compression and a second compression means for performing the fixed length compression use the common circuit. Furthermore, a distinction is made between the case where the quantization parameter is fixed and the case where the length is made to be variable so as to make it a fixed length by trial and error. In addition, predetermined parameters are set by the control unit 7 so that the first and the second compression means are provided with their functions. However, the compression means may possess individual circuit structures.

Furthermore, the compression means and the elongation means may be arranged in such a manner that they are formed into individual systems.

After recording has been completed by the above-described method, data may be displayed on a monitor by an image reproducing device having a means for decoding the code data or a hard copy of it may be obtained by a copying device.

The recording medium may be a magnetic disk or the like which employs the magnetic recording method, an optical disk or the like which employs the optical recording method, a semiconductor memory such as an IC card, a ROM and a RAM, or a recording medium capable of recording image data.

Furthermore, the quantization step for preventing the deterioration in the image may be omitted at the time of the VLC in the continuous photographing mode.

The compression algorithm is not limited to the above-described JPEG method. For example, the arithmetic encoding method, the run length encoding method, the Huffman encoding method and a facsimile encoding method such as the MH, MR and MMR may be employed. That is, any encoding method may be employed if it is a method which is capable of performing both of the fixed length compression and the variable length compression by changing the quantization parameter or the encoding parameter at the time of the encoding operation.

As described above, according to the present invention, an image signal can efficiently be encoded. In particular, since recording can be performed at high speed while securing a satisfactorily large number of recording images, an image processing apparatus capable of performing compression encoding, which can be preferably adapted to, for example, the continuous photographing mode, can be provided.

Third Embodiment

According to this embodiment, there is provided a recording method utilizing the advantages of the two compression methods, that is, the above-described VLC and FLC and capable of recording a satisfactory number of images per recording medium while preventing the image quality deterioration.

According to this embodiment, an image is basically first recorded by the VLC. A sufficiently small value of F is selected in order to prevent the image quality deterioration. At a moment at which the total amount of encoded data of a plurality of images recorded by the VLC reaches a predetermined quantity, the images are decoded if the number of the images has not reached a number which must be realized with the above-described total amount of encoded data. Then, the image is again encoded by the FLC in order to make the total amount of encoded data smaller than the amount of encoded data which enables the number of the images to be recorded.

At this time, the amount of encoded data is not equally allocated to all of the images, but the amount of encoded data to be allocated is determined in proportion to the amount of encoded data at the time of the first encoding by the VLC. For example, it is considered that an image having a large amount of encoded data realized by the VLC has a large number of information items about the image. Therefore, the image is again encoded with a relatively large amount of encoded data.

According to the above-described recording method, the amount of encoded data can be allocated while arranging a satisfactory balance for the contents of the subject image. Furthermore, a desired number of the recordable images on the recording medium can be reliably realized.

The above-described process will be further specifically described.

Prior to making the description, an assumption is made that a digital still camera having a magnetic disk as a recording medium the total recordable capacity of which is 2 Mbytes is used. Another assumption is made that 20 images can be recorded per magnetic disk, where the average allocated amount of encoded data per image is 100 Kbytes.

For example, in a case where a plurality of images are recorded by the VLC and 20 or more images can be recorded at the moment at which the total record capacity exceeds 1900 Kbytes, the number of images which must be recorded can be realized while maintaining the image quality. Therefore, there is no problem in this case. Therefore, an assumption is made that 19 or less images have been recorded. For example, a case in which 10 images have been recorded will be described. In this case, FLC is performed to again encode the image to make the total amount of encoded data for the 10 images to be 10×100 kbytes (=1 Mbyte).

An assumption is made that the amount of encoded data of each image at the time when they are encoded by the VLC is VLCvolume (i), where symbol i denotes the number of the image recorded.

The total amount of encoded data VLCsum for an image encoded by the VLC can be expressed by the following Equation (1):

$$VLCsum = \sum_{i=1}^{10} VLCvolume\ (i) \quad (1)$$

An assumption is made that the amount of encoded data required to again encode image i is FLCvolume (i), where FLCvolume (i) is given by allocating VLCsum by the ratio of VLCvolume (i). FLCvolume (i) at this time can be given from the following Equation (2):

$$FLCvolume\ (i) = \frac{VLCvolume\ (i)}{VLCsum} \times 100\ \text{Kbytes} \times 10 \quad (2)$$

Since VLCsum is necessarily larger than 100 Kbytes×10, FLCvolume (i) is, from Equation (2), necessarily smaller than VLCvolume. Therefore, by deleting data on the recording medium after the VLC code has been decoded, the decoded code can be re-encoded by FLC and recorded to the recording medium.

When all of the 10 images have been again encoded by the FLC, the total amount of encoded data for 10 images is 1 Mbytes. Therefore, the blank capacity on the magnetic disk is 1 Mbyte. The image which has been subjected to the re-encoding process is not again subjected to the re-encoding. That is, the similar recording process is performed in such a manner that the 10 images can be recorded by using the residual 1 Mbyte. That is, the re-encoding is performed by the FLC in such a manner that the total amount of encoded data of the magnetic disk at the time when the i-th (i>10) image is recorded by the VLC is larger than 1900 Kbytes and the total amount of encoded data for (i−10) novel images recorded by the VLC when i is smaller than 19 is (i−10) * 100 Kbytes.

The block structure of the image signal recording apparatus according to this embodiment is the same as that shown in FIG. 2.

Usually, the control unit 7 performs recording by the VLC in accordance with the following sequential order:

When the release button is depressed, the control unit 7 performs focusing and operates the diaphragm, the shutter and the like so as to expose the image pickup device 2 so that image information is fetched into the image memory 4. The control unit 7 transmits quantization parameter F to the encode device 5 and instructs the record device 6 to transmit code data. The control unit 7 further instructs the record device 6 to receive code data and to perform recording.

As a result, code data of a variable length can be recorded to the record device 6.

When the amount of encoded data of the image encoded by the VLC exceeds a predetermined value, all of the variable length code is read out by the record device 6 from the recording medium before decoded into image information by the encode device 5 so as to be registered into the image memory 4. Similarly to the encoding operation, the above-described process is performed under control of the control unit 7. The amount of encoded data to be allocated to each image is calculated by the control unit 7 so that encoding and recording are performed by the FLC in such a manner that the amount of encoded data becomes the amount of encoded data thus-calculated.

The control unit 7 performs recording using the FLC.

The control unit 7 supplies parameter F to the encode device 5 so as to cause image data stored in the image memory 4 to be compressed. Furthermore, the code amount is counted. At this time, the encode device 5 does not transmit code data but the same counts the amount of encoded data for one frame.

The above-described operations are performed while changing F until a desired amount of encoded data can be obtained so that a plurality of trial-and-error operations are performed.

At the time when F (hereinafter designated by symbol "Fa"), which enables a desired amount of encoded data to be generated, is obtained, the control unit 7 again supplies the parameter Fa to the encode device 5 and instructs the record device 6 to transmit code data. The control unit 7 instructs the record device 6 to receive/record the code data.

The compressed code having a fixed-length for each image as a result of the above-described process is recorded on the recording medium of the record device 6.

The structure of the encoding device 5 is the same as that shown in FIG. 4.

Figure 5A:
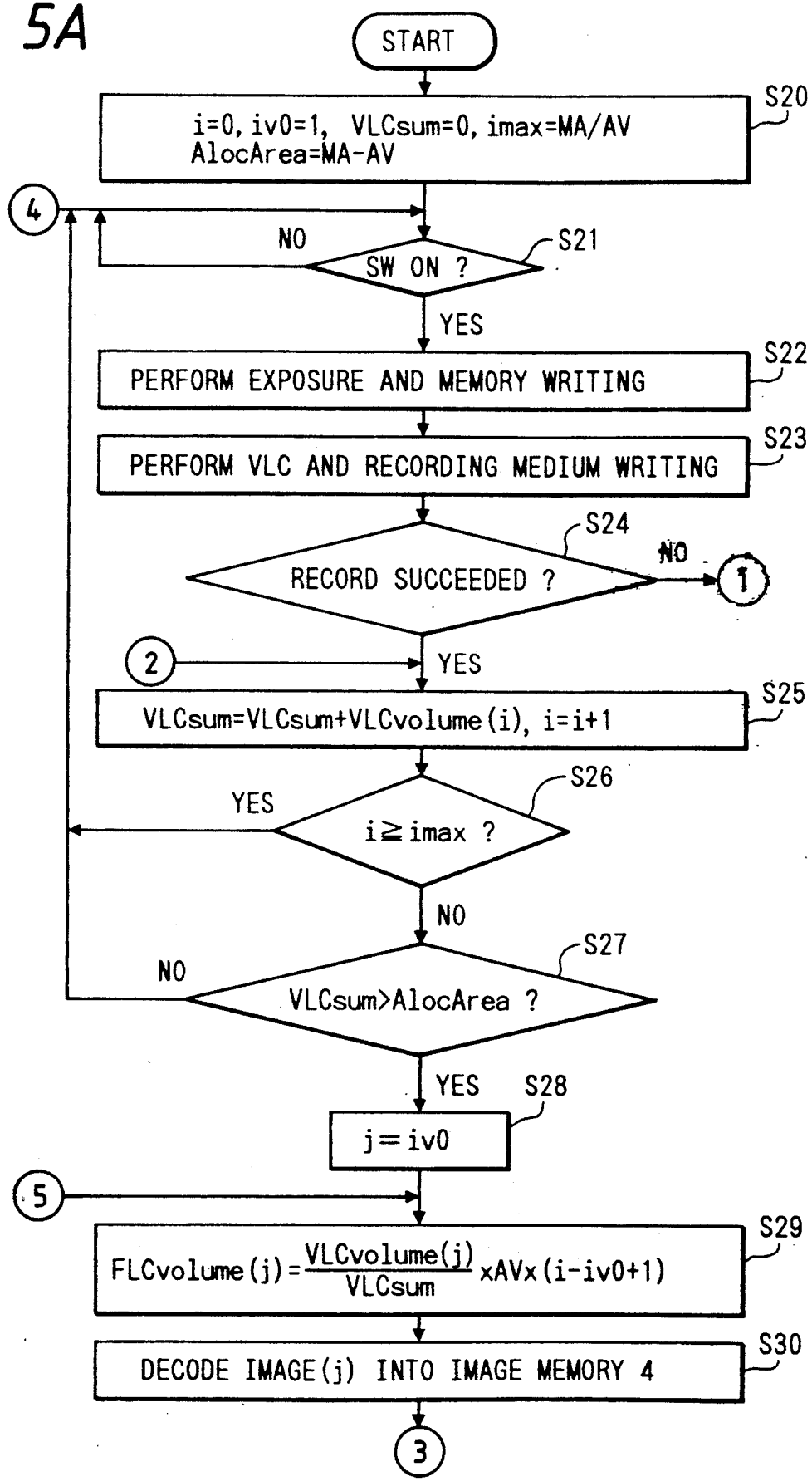
FIGS. 5A and 5B respectively are flow charts which illustrate a third embodiment of the present invention.
Figure 5B:
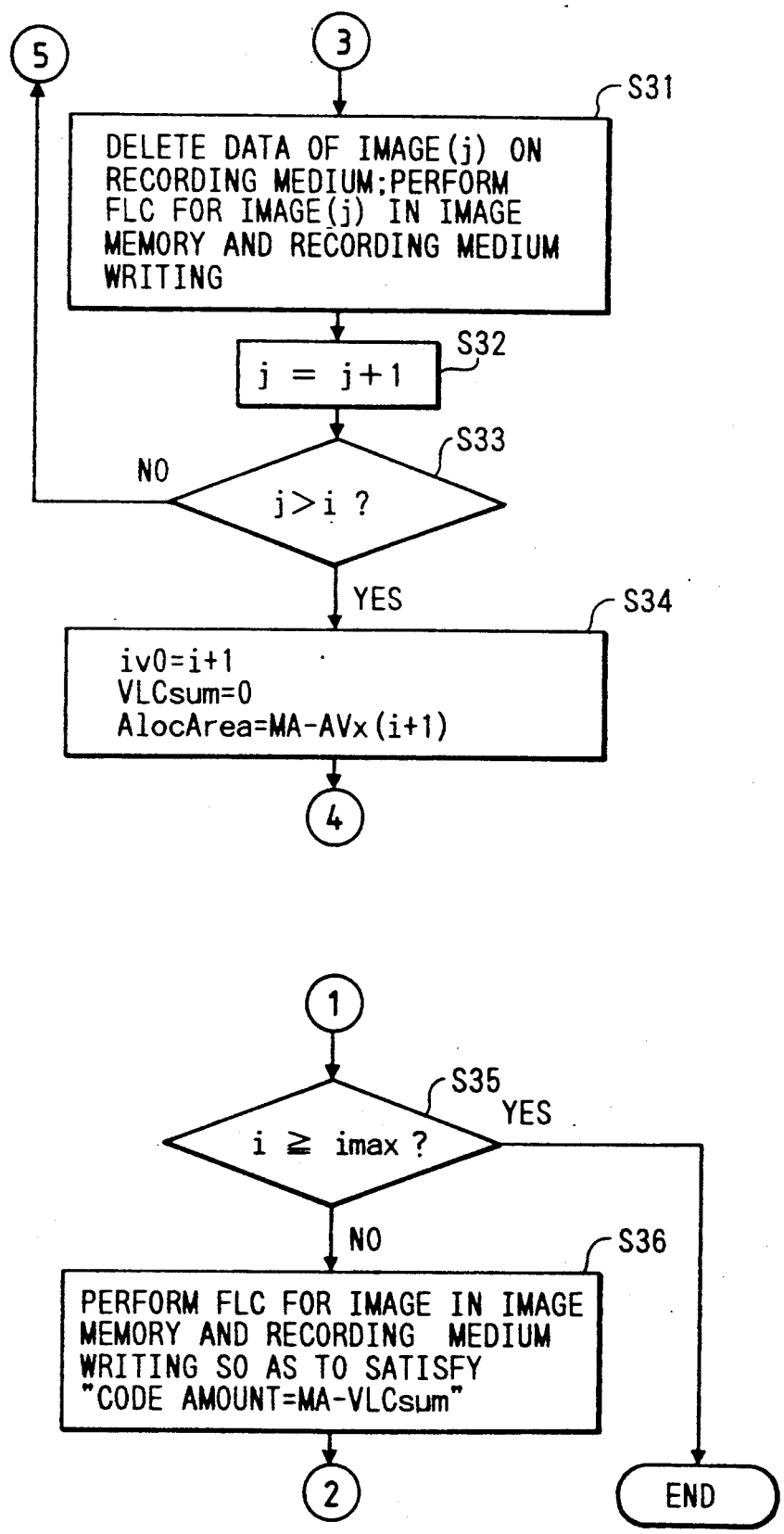

A specific flow chart of the above-described embodiment is shown in FIGS. 5A and 5B. Referring to FIGS. 5A and 5B, symbols i, j, iv0, VLCsum, VLCvolume ( ), FLCvolume ( ) and AlocArea are variables and imax, MA and AV are constants. Symbol i denotes the number of the image given in accordance with the photographing order and symbol iv0 denotes the first number of the image recorded by the VLC. Symbol VLCsum denotes the total amount of encoded data of the image which has been recorded by the VLC and the code length of which has not been adjusted. Symbol VLCvolume (i) denotes the code length of the i-th image realized due to the VLC, arrangement FLCvolume (i) denotes a desired code length for use to adjust the amount of encoded data of the i-th image and AlocArea denotes a blank capacity for temporarily recording a plurality of images to be recorded on the recording medium by the VLC. Symbol AV denotes an average allocated length per image. Therefore, the number imax of the recordable images per recording medium can be given by MA/AV.

In step S20, the variable is initialized. That is, assumptions are made that i=0, iv0=1 and VLCsum =0. AlocArea is obtained by subtracting average data amount AV from total recordable capacity MA. That is, a marginal capacity of about one image is provided. The number imax of the recordable images per recording medium is obtained by dividing total recordable capacity MA by average data amount AV.

Step S21 waits for the release button to be depressed. When the release button is depressed, exposure is performed and writing to the image memory 4 are performed in step S22.

In step S23, image in the image memory 4 is formed into a VLC code before it is written to the recording medium. The recorded amount of encoded data at this time is stored in VLCvolume (i).

In step S24, it is determined whether or not all of code data items could be recorded on the recording medium. If all of the code data items could be recorded as described above, the flow proceeds to step S25. The case where all of the code data items could not be recorded is an exceptional case where the amount exceeds the blank capacity the size of which is average data amount and which exists on the recording medium. In this case, the number of images recorded and a predetermined number of images are subjected to a comparison in step S35. If the number of the recorded images exceeds the predetermined number, recording on the above-described recording medium is completed here. If the number of the recorded images has not reached the predetermined number, the flow proceeds to step S36 in which FLC recording in a blank region on the recording medium is performed. The recorded amount of encoded data at this time is stored in VLCvolume (i) before the flow proceeds to step S25.

In step S25, i and VLCsum are updated in such a manner that i=i−1, VLCsum=VLCsum VLCvolume (i) VLCvolume (i), i=i+1.

In step S26, whether or not the predetermined number of images has been recorded is determined. If the predetermined number of images has not been recorded (i≧imax), there is no necessity of adjusting the amount of encoded data. Therefore, the flow returns to step S21 which waits for the release button to be depressed. If the predetermined number of images has not been recorded (i<imax), the flow proceeds to step S27.

In step S27, it is discriminated whether or not VLCsum exceeds allocated capacity AlocArea for the variable length code. If it does not exceed, the flow returns to step S21. If it exceeds AlocArea, the flow proceeds to step S28.

In a loop defined by steps S28 to S32, images iv0 to i are re-encoded for the purpose of adjusting the amount of encoded data.

In step S29, the amount of encoded data to be allocated to image j is obtained by the following equation:

$$FLCvolume\ (j) = \frac{VLCvolume\ (j)}{VLCsum} * Average\ Volume * (i - iv0 + 1) \quad (3)$$

According to Equation (3), the amount of encoded data in proportion to VLCvolume (j) is allocated similarly to Equation (2). Referring to Equation (3), term $(i-iv0+1)$ denotes the number of images which have not been subjected to the adjustment of the amount of encoded data. Therefore, by multiplying AverageValue, the total amount of encoded data to be allocated to $(j-iv0+1)$ images can be expressed.

In step S30, image j is decoded in the image memory.

In step S31, codes on the medium are deleted before FLC recording of images in the image memory is performed.

Since re-encoding of the $(i-iv0+1)$ images has been completed in a loop defined by steps S28 to S32, variables iv0, VLCsum and AlocArea are updated in step S34. Then, the flow returns to step S21.

Fourth Embodiment

According to the above-described embodiments, the amount of encoded data is allocated by the amount of encoded data in proportion to the degree of VLCvolume (i). The present invention is not limited to this. For example, a structure may be employed which is arranged in such a manner that an image the degree of VLCvolume (i) which is smaller than AverageValue is not re-encoded. In this case, the images except for the above-described image are re-encoded so as to adjust the amount of encoded data. It might be feasible to employ another structure which is arranged in such a manner that images having VLCvolume (i), which is larger than a certain amount x of encoded data, are assumed that they have a amount of encoded data of x and a proportional allocation is performed. The above-described idea utilizes a fact that a complex image exceeding a certain degree does not encounter an excessive deterioration even if it is compressed.

Although the apparatus automatically enters the re-encoding sequence according to the above-described embodiments, another structure may be employed which is arranged in such a manner that an alarm for a user is displayed if VLCsum > AlocArea in step S27 so as to cause the user to adjust the amount of encoded data or change the recording medium because the capacity is too small. Furthermore, if the user instructs the adjustment of the amount of encoded data to be performed, the flow proceeds to the sequence ensuing the step S28.

Although the above-described embodiments are arranged in such a manner that the amount of encoded data is adjusted when the amount of variable length encoded data becomes a predetermined quantity, another structure may be employed which is arranged in such a manner that the amount of encoded data is adjusted when the number of images encoded by VLC becomes a predetermined number. For example, the amount of encoded data may be adjusted by re-encoding in units of 5 images performed for each 5 images.

Any of the above-described cases is arranged in such a manner that, in a case where the amount of encoded data is automatically adjusted, the continuous photographing operation is stopped if the adjustment of the amount of encoded data is commenced during the continuous photographing operation. Therefore, another structure may be employed which is arranged in such a manner that the adjustment of the amount of encoded data is not commenced during the continuous photographing but the same is adjusted after the continuous photographing operation has been completed.

According to the above-described embodiment, the first compression means for performing the variable length compression and a second compression means for performing the fixed length compression use the common circuit. Furthermore, a distinction is made between the case where the quantization parameter is fixed and the case where the length is made to be variable so as to make it a fixed length by trial and error. In addition, predetermined parameters are set by the control unit 7 so that the first and the second compression means are provided with their functions. However, the compression means may possess individual circuit structures.

Furthermore, the compression means and the elongation means may be arranged in such a manner that they are formed into individual systems.

After recording has been completed by the above-described method, data may be displayed on a monitor by an image reproducing device having a means for decoding the code data or a hard copy of it may be obtained by a copying device.

The recording medium may be a magnetic disk or the like which employs the magnetic recording method, an optical disk or the like which employs the optical recording method, a semiconductor memory such as an IC card, a ROM and a RAM, or a recording medium capable of recording image data.

The compression algorithm is not limited to the above-described JPEG method. For example, the arithmetic encoding method, the run length encoding method, the Huffman encoding method and a facscimile encoding method such as the MH, MR and MMR may be employed. That is, any encoding method may be employed if it is a method which is capable of performing both of the fixed length compression and the variable length compression by changing the quantization parameter or the encoding parameter at the time of the encoding operation.

As described above, according to the above-described embodiments of the present invention, the amount of encoded data can be allocated to adapt to the image while enabling a predetermined number of images to be recorded. Therefore, excessive deterioration in the image quality can be prevented. Furthermore, since the VLC is being performed the compression speed can be raised in comparison to the FLC. Therefore, an effect can be obtained in that a larger number of images can be photographed in the continuous photographing mode of the camera.

According to the present invention, the deterioration in the image quality can be prevented and thereby the image can be compressed efficiently.

Fifth Embodiment

The block diagram which illustrates the "electric still camera" according to this embodiment is arranged similarly to that shown in FIG. 2.

When a user depresses a release button (omitted from illustration), the control unit 7 performs focusing and operates the diaphragm and the shutter so as to expose the image pickup device 2. As a result, image information is fetched by the image memory 4. The control unit 7 transmits quantization parameter F to the encode device 5 so that image data stored in the image memory 4 is compressed and the amount of encoded data is counted. At this time, the encode device 5 does not transmit code data to the record device 6, but the same counts only the amount of encoded data for one frame.

Trial and error of the above-described operation is repeated a plurality of times while changing parameter F until the amount of encoded data becomes a desired (a predetermined) amount of encoded data.

When F (hereinafter called "$\overline{F}$") which enables a desired amount of encoded data to be generated is obtained, the control unit again supplies parameter $\overline{F}$ to the encode device 5 so that the compression operation is commenced. The control unit 7 instructs the record device 6 to record code data.

As a result of the above-described process, code data formed into the fixed length frame unit is recorded by the record device 6.

In a case where the user selects the continuous photographing mode by using the mode switch, the control unit 7 performs recording in accordance with the following sequence:

At the time of recording the first image, the fixed length compression is performed in the same sequential order as that performed at the time of the above-described ordinary recording mode so that recording is performed. The fixed-length compression of the amount of encoded data by the repetition process is not performed from the second and ensuing images, but compression and recording are performed by using the value $\overline{F}$ used at the time of recording the first image. That is, after the image is supplied to the memory 4, the control unit 7 supplies F to the encode device 5 and as well as instructs the record device 6 to transmit encode data so that the compression operation is performed. Simultaneously, the control unit 7 instructs the record device 6 to record code data.

It is predicted that the correlation of the images to be continuously photographed is strong. Therefore, by using, as the parameter from the second and ensuing images, parameter $\overline{F}$ with which the first image has been fixed-length compressed, it is expected that the amount of compression encoded data from the second and the ensuing images approximates the amount of compression encoded data of the first image. Thus, recording can be performed with the amount of compression encoded data, which approximates a desired amount of encoded data, within a predetermined time period while exhibiting a significantly large number of images in comparison to the case where only the fixed length compression is performed.

Figure 6:
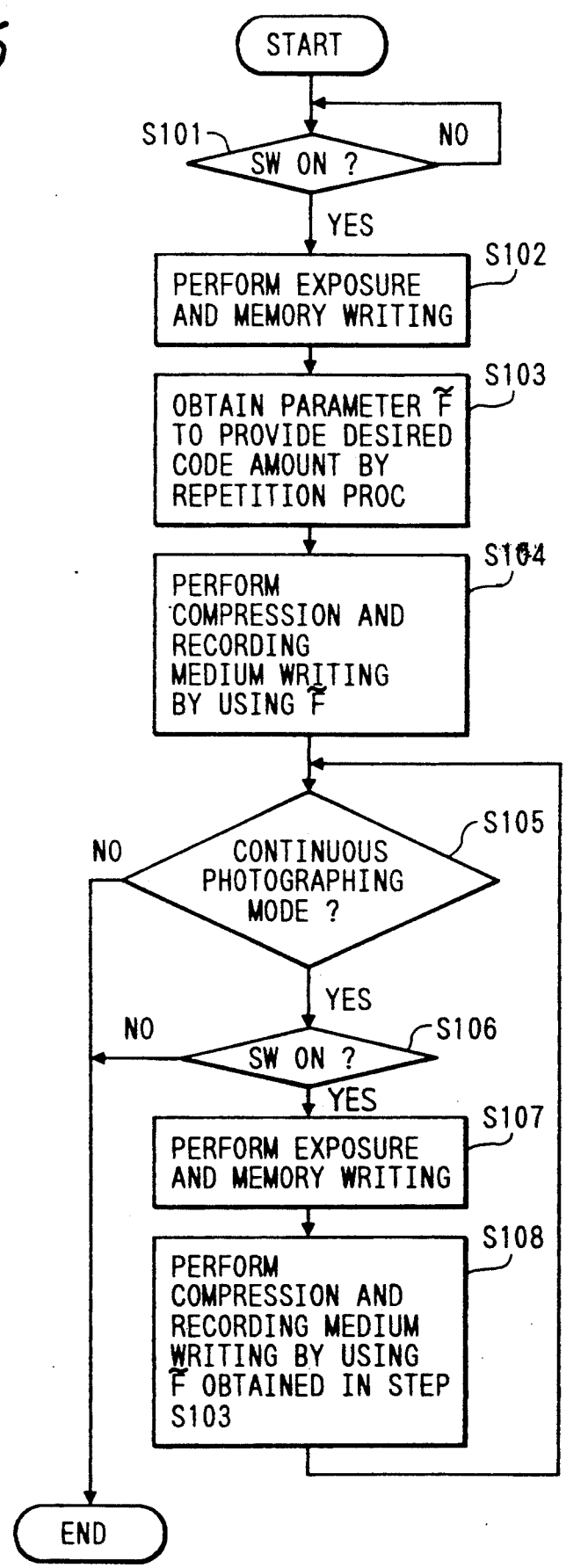
FIG. 6 is a flow chart which illustrates the operation of a fifth embodiment of the present invention.

A specific flow chart of the above-described embodiment is shown in FIG. 6.

Referring to FIG. 6, a depression of the release button is waited for in step S101. If it is depressed, exposure of the image pickup device 2 and image writing to the memory 4 are performed in step S102. In step S103, parameter $\overline{F}$ which gives a desired amount of compression encoded data is obtained. In step S104, compression is performed by using $\overline{F}$ obtained in step S103 so as to record it to the recording medium of the record device 6.

If the continuous photographing mode is not set in step S105, the recording operation is completed here. If the same is set, the flow proceeds to step S106 in which a discrimination is made whether or not the release button has been depressed. If the same has not been depressed, the recording operation is completed here. If the same has been depressed, the flow proceeds to step S107 in which exposure of the image pickup device 2 and image signal writing to the memory 4 are performed. In step S108, the image signal is compressed by using $\overline{F}$ obtained in step S103 so as to record it on the recording medium of the record device 6 before the flow returns to step S105. As described above, in the processes ensuing the step S105, the operation of obtaining parameter $\overline{F}$ (fixed-length compression), which generates a desired amount of encoded data by the repetition process, is not performed.

Then, the operations to be performed in step S103 shown in FIG. 6 will now be described.

As described in Document 1, the amount of compression encoded data is a monotone decrease function of parameter F while holding the relationship approximated by the following equation:

$$\text{Log Bit} = A \text{ Log } F + B \qquad (1)$$

Referring to Equation (1), term "Bit" denotes the amount of compression encoded data and A and B are constants respectively depending upon the image. Assuming that amounts Bit1 and Bit2 of compression encoded data with respect to two certain parameters $F_1$ and $F_2$ are experimentally obtained, estimated values $\hat{A}$ and $\hat{B}$ of constants A and B are obtained from Equation (1);

$$\hat{A} = \frac{\text{Log Bit1} - \text{Log Bit2}}{\text{Log } F_1 - \text{Log } F_2} \qquad (2)$$

$$\hat{B} = \text{Log Bit2} - \hat{A} \text{ Log } F_2 \qquad (3)$$

From Equations (1), (2) and (3), parameter $\overline{F}$ which generates a desired code quantity $\widetilde{\text{Bit}}$ is estimated from the following equation:

$$\overline{F} = 10^{\frac{1}{\hat{A}} \text{Log}(\widetilde{Bit}) - \hat{B}} \qquad (4)$$

Figure 7:
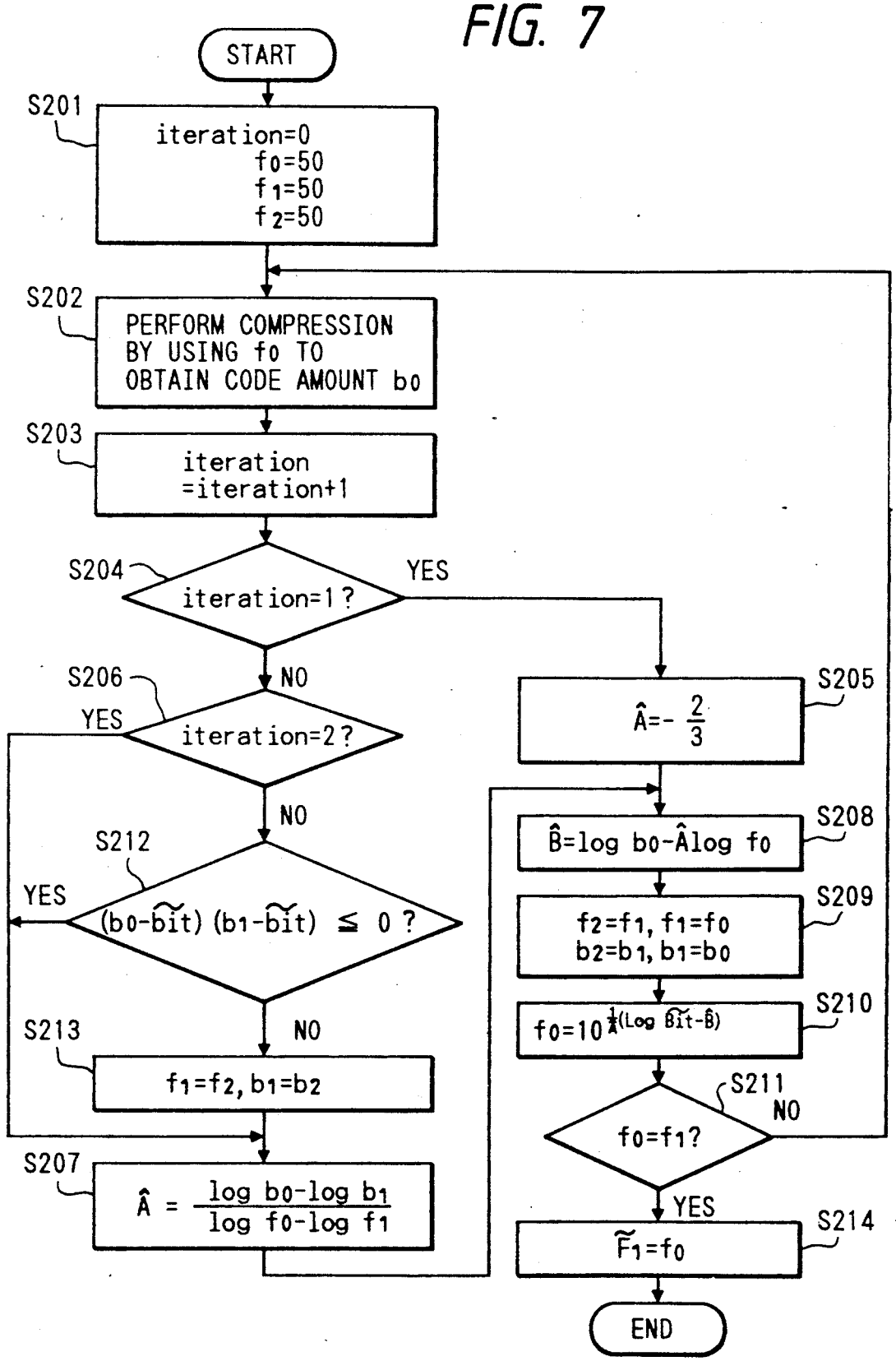
FIG. 7 illustrates step S103 shown in FIG. 6.

In step S103 shown in FIG. 6, Equations (2), (3) and (4) are repeatedly used to converge $\overline{F}$. A flow chart of the above-described process is shown in FIG. 7. The above-described process is able to be adapted to the first to the fourth embodiments.

Referring to FIG. 7, variable iteration denotes the times of the repetition processes performed and terms $f_0$, $f_1$ and $f_2$ respectively denote the value of parameter F at the present trial, the value at the previous trial and the value at the trial two time before. Terms $b_0$, $b_1$ and $b_2$ respectively denote the amounts of encoded data when parameter F is $f_0$, $f_1$ and $f_2$.

Figure 8A:
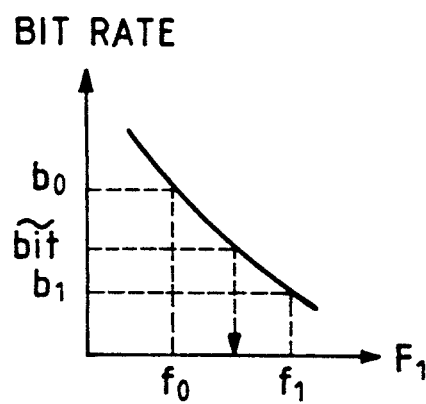
FIGS. 8A and 8B illustrate the conditions when $\overline{F}$ is converged at high speed.
Figure 8B:
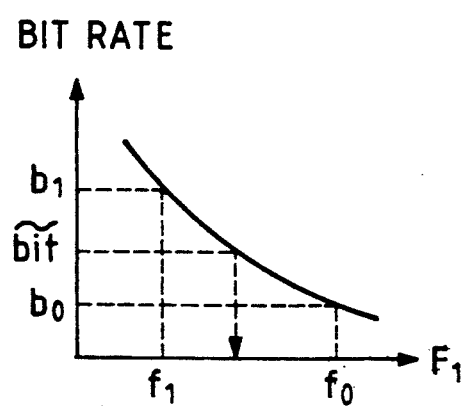
Figure 9A:
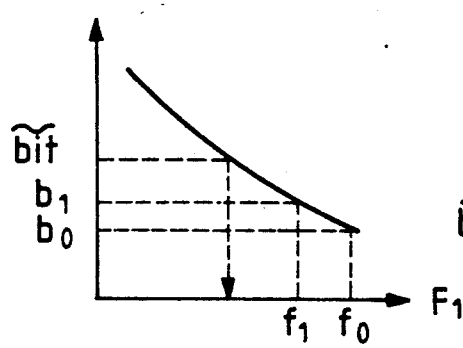
FIGS. 9A and 9B illustrate conditions when $\overline{F}$ is not converged.
Figure 9B:
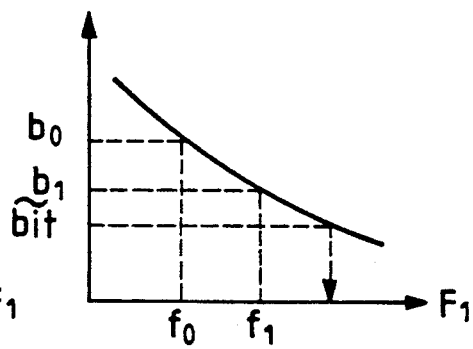
Figure 10A:
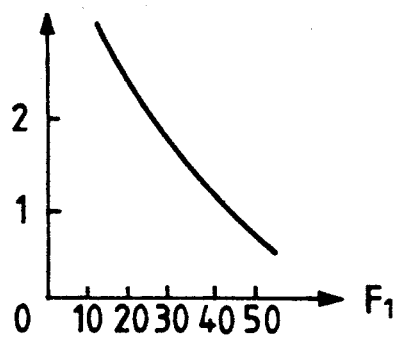
FIGS. 10A and 10B illustrate the relationship between parameter F and the amount of encoded data.
Figure 10B:
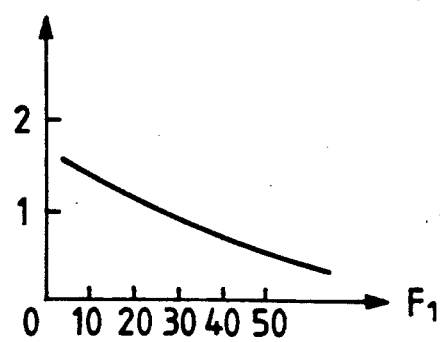

The flow of the above-described process will now be described. In step S201, the variables are initialized. In step S202, compression is performed while making the value of parameter F to be $f_0$ so that encoded data amount $b_0$ is obtained. In step S203, iteration is increased by only 1. In step S204, the value of $\overset{\approx}{A}$ is set to $-\frac{2}{3}$ at the first repetition process. At the second repetition process, the flow proceeds to step S207 in which the estimated value of is calculated by using Equation (2). At the third and ensuing process, an examination of the relationship is, in step S212, made between amounts $b_0$ and $b_1$ of compression encoded data at the present and the previous trials and desired encoded data amount $\widetilde{B}$it. A fact is known from experience that it is preferable that the relationship between $f_0$, $f_1$ and $\overline{f}$ holds the conditions shown in FIGS. 8A and 8B in order to complete the conversion in a shorter time. If the next estimated value of f is obtained under conditions shown in FIGS. 9A and 9B in which the above-described conditions shown in step S212 are not met, the conversion cannot sometimes be made. The reason for this lies in that Equation (1) is a simple approximation. Accordingly, if the conditional equation shown in step S212 is not met, the flow proceeds to step S213 in which data of the two times before is made to be $f_1$ and $b_1$ in step S213 before the estimated value of $\overline{A}$ is obtained in step S207.

In step S208, $\overset{\approx}{B}$ is obtained by using Equation (3) before trial value $f_0$ of the next F is obtained in step S210.

In step S211, the present trial value $f_0$ and the previous trial value $f_1$ are subjected to a comparison. If they coincide with each other, a discrimination is made that the conversion has taken place and thereby the value of $\overline{F}$ is made to be $f_0$. If they do not coincide with each other, the flow returns to step S202.

According to the above-described embodiment, the first image of the continuous mode is subjected to the fixed length compression so as to obtain parameter $\overline{F}$ which gives a desired code quantity. The second and ensuing images are subjected to the variable length compression by using the value of $\overline{F}$ thus-obtained. However, the present invention is not limited to this.

According to the above-described embodiment, it takes an excessively long time to record the first image. Accordingly, another structure may be employed which is arranged in such a manner that parameter F of the first image is set to a predetermined value and the variable length encoding is performed while omitting the repetition process. In this case, the value F is determined experimentally.

According to the above-described embodiment, the variable length mode compression is necessarily performed in the continuous photographing mode. Another structure may be employed which is arranged in such a manner that the fixed length compression and the variable length compression are switched over in accordance with the continuous photographing speed because the fixed length compression can be performed in the continuous photographing operation of a speed of about 10 frames/sec.

In a case where the variable length compression is performed as described above, the amount of encoded data becomes different depending upon the image. Therefore, a predetermined number of images recordable on the recording medium cannot be reliably recorded. For example, a problem may occur in that recording cannot be performed although the shutter has been depressed. In this case, a countermeasure is taken by informing the user that the blank capacity is insufficient and the recording medium should be changed. Then, the change of the recording medium is waited for before recording on the changed recording medium is performed.

According to the above-described embodiment, the fixed length compression and the variable length compression are automatically switched over in the continuous photographing mode. However, another structure may be employed which is arranged in such a manner that the fixed length compression and the variable length compression are manually switched over by a user regardless of the instructed mode, the ordinary mode or the continuous photographing mode. In this case, it might be feasible to employ specifications arranged in such a manner that the continuous photographing speed, which can be set in a case where the fixed length compression is selected, is 10 frames/sec and the continuous photographing speed, which can be set in a case where the variable length compression is selected, is 30 frames/sec.

Although the ADCT is employed as the compression method according to the above-described embodiment, the present invention is not limited to the ADCT method. The present invention can be adapted to an electronic still camera having two compression encoding means which are respectively capable of the variable length compression and the fixed length compression.

As described above, according to the present invention, an apparatus having a compression encoding unit which can be suitably adapted to the continuous photographing mode can be provided.

According to the embodiments described, the maximum number of images which can be photographed at the continuous photographing mode can be significantly increased in comparison to a structure in which only the fixed length compression is performed.

Sixth Embodiment

Figure 12:
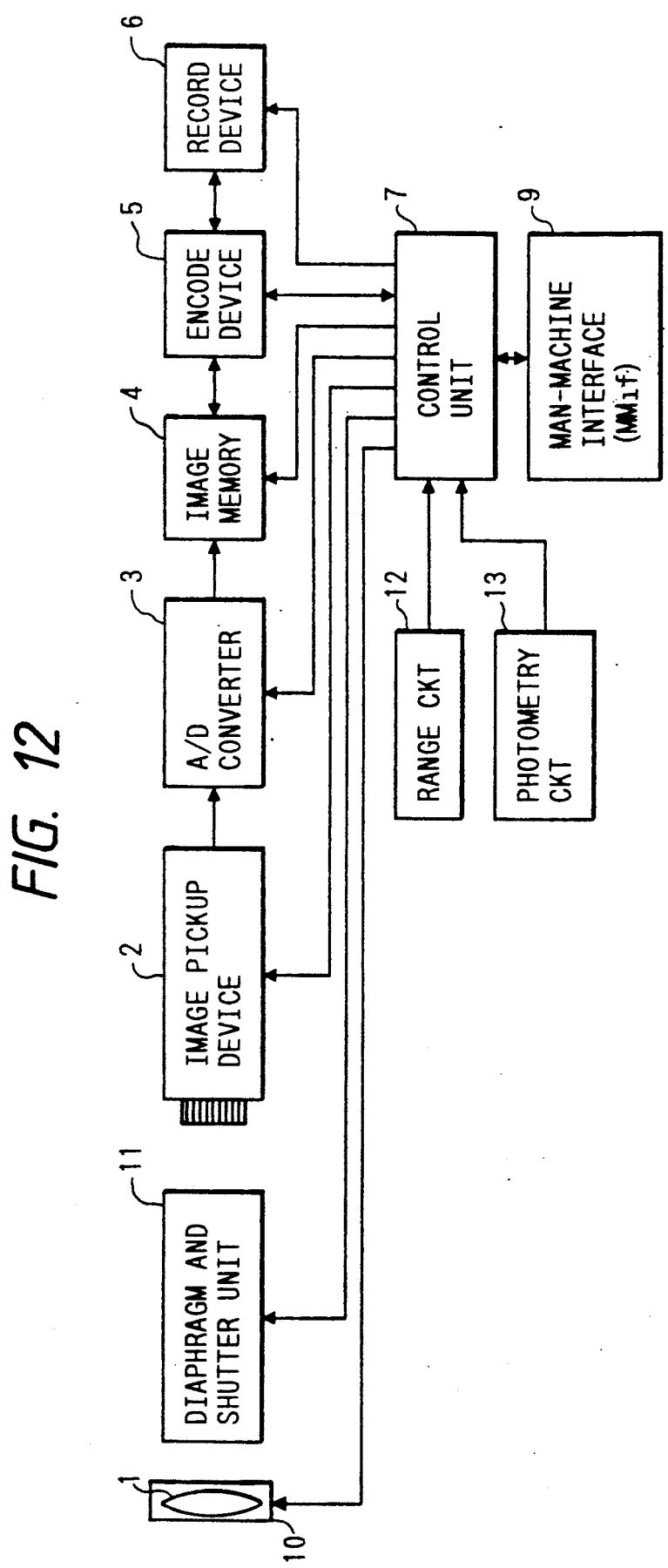
FIG. 12 is a block diagram which illustrates the structure of the sixth embodiment of the present invention.

FIG. 12 is a block diagram which illustrates the structure of a sixth embodiment of the present invention.

The blocks having the same functions as those shown in FIG. 2 are given the same reference numerals. Referring to FIG. 12, reference numeral 10 represents an actuator unit for moving a lens 1 in a focusing direction in response to a focus control signal transmitted from the control unit 7. Reference numeral 11 represents a diaphragm and shutter unit for controlling the diaphragm and the shutter speed in accordance with a diaphragm value and the shutter speed transmitted from the control unit 7. Reference numeral 12 represents a range circuit for measuring the distance between the lens 1 and a subject (omitted from illustration). Reference numeral 13 represents a photometry circuit for measuring the brightness of the subject (omitted from illustration).

The control unit 7 generates the focus control signal in accordance with the distance measured by the range circuit 12, the control unit 7 further generating a signal denoting the diaphragm value and the shutter speed in accordance with the brightness measured by the photometry circuit 13.

Figure 11A:
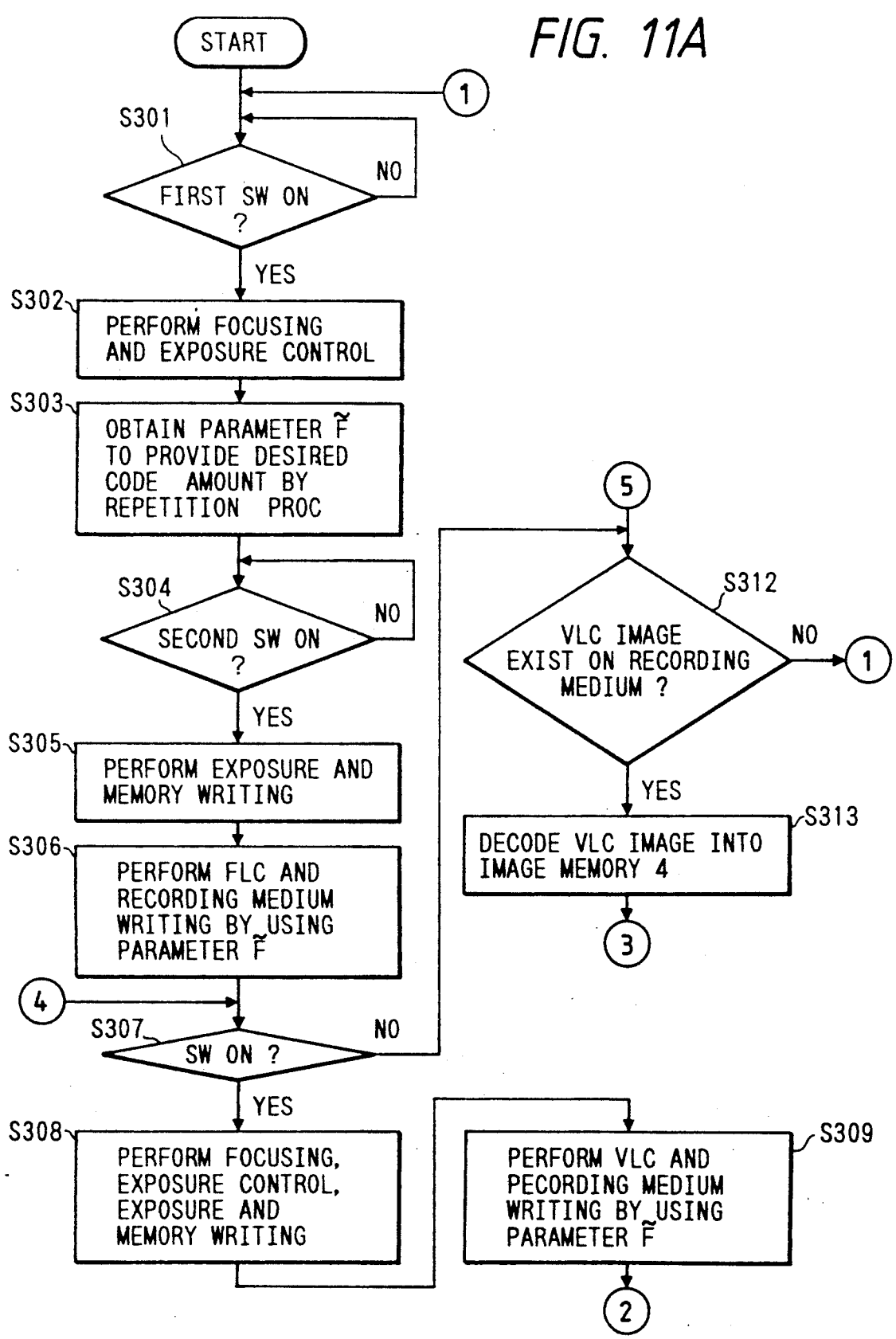

Then, the control operation performed by the control unit 7 will now be described with reference to flow charts shown in FIGS. 11A and 11B.

In step S301, when the release button is depressed half, a discrimination is made that the first switch is switched on. Accordingly, the flow proceeds to step S302. A state of waiting is realized until the release button is depressed half. In step S302, the control unit 7 performs the focus control and the exposure control such as the diaphragm and the shutter speed controls in accordance with data supplied from the range circuit 12 and the photometry circuit 13.

In step S303, parameter $\overline{F}$ for the quantization is obtained under conditions the focusing position, the diaphragm and the shutter speed set in accordance with the subject. That is, the parameter $\overline{F}$ is obtained such that a desired code quantity is realized by the above-describe repetition process.

In step S304, when the release button is fully depressed, a discrimination is made that the second switch is switched on so that the flow proceeds to step S305. The waiting state is realized until the release button is fully depressed.

In step S305, exposure to a CCD is performed so that image data is written to the image memory 4.

In step S306, the encode device 5 performs the FLC (Fixed Length Coding) by using parameter F obtained in step S303 so as to write code data to the recording medium of the record device 6.

In step S307, it is determined whether or not the release button is continuously being depressed. If the release button is being depressed, a discrimination is made that the present mode is the continuous photographing mode. Therefore, the flow proceeds to step S308.

In step S308, focusing and exposure controlling for the next image are performed and as well as the CCD is exposed to light so that image data is written to the image memory 4.

In step S309, image data stored in the image memory 4 is encoded by using parameter $\overline{F}$ obtained in step S303. In a case where the image has been changed from the previous image, it is considered that the code data quantity will be changed if the same parameter $\overline{F}$ as that for the previous image is used. Accordingly, VLC (Variable Length Coding) is basically performed in step S309.

In step S310, it is discriminated whether or not the number of images to be continuously photographed is larger than number n of the images, which can be stored in the image memory 4 and the record device 6. If it is larger than n, the flow proceeds to step S311 in which a fact of memory overflow is displayed on a display of an MMif9 before the flow proceeds to step S312. In a case where i≦n, the flow proceeds to step S307 so as to continue the continuous photographing operation.

If the release button has not been depressed in step S307, the flow proceeds to step S312 in which a discrimination is made whether or not the VLC image exists on the recording medium. If it does not exist, the flow returns to step S301. If it exists as described above, the VLC image is decoded in step S313, the decoded image data being then stored in the image memory 4. In step S314, code data on the recording medium, which has been decoded in step S314, is deleted. In step S315, the FLC is performed so that code data is written to the recording medium. The above-described operation is the same as that performed according to the first embodiment.

As described above, according to this embodiment, the continuous photographing operation is performed in such a manner that the coding of the variable length is performed by making the quantization parameter for the second and ensuing images to be the same as that for the first image. Therefore, the process of determining the parameter can be omitted so that high speed continuous-photographing can be performed.

Furthermore, the quantization parameter is determined after the focus control and the exposure control have been performed. Therefore, a parameter which is suitable for the actual subject can be determined.

In addition, the VLC image is converted into the FLC image after the number of images have been continuously photographed. Therefore, the quantity of code data to be recorded on the recording medium can easily be controlled.

Although the description of the above-described embodiment is made with reference to an electronic still camera, a similar control can be performed in the other type apparatus.

For example, in a case where image data is subjected to the variable length encoding and the same is again decoded and printed after the same has been temporarily stored in a memory, the quantization parameter may be obtained after processing conditions such as the exposure quantity and the like have been determined by pre-scanning.

The present invention is not limited to the FLC (Fixed Length Coding) which is used in the above-described embodiment and which is precisely controlled to a predetermined code quantity. A predetermined quantity of error is permitted.

Although the invention has been described in its preferred form with a certain degree of particularly, it is understood that the present disclosure of the preferred form has been changed in the details of construction.

The combination and arrangement of parts may be resorted to without departing from the spirit and the scope of the invention as hereinafter claimed.

What is claimed is:

1. An image processing apparatus comprising:
   first coding means for coding input image data into code data having a variable length;
   second coding means for coding code data having the variable length and coded by said first coding means into code data having a fixed length; and
   memory means for storing code data coded by said first coding means.

2. An image processing apparatus according to claim 1 further comprising decoding means for decoding code data having the variable length and coded by said first coding means.

3. An image processing apparatus according to claim 1, wherein each of said first coding means and said second coding means performs coding by using orthogonal conversion.

4. An image processing apparatus according to claim 1, wherein each of said first coding means and said second coding means have quantization means for quantizing input data.

5. An image processing apparatus according to claim 4, wherein a quantization parameter of said first coding means and a quantization parameter of said second coding means are different from each other.

6. An image processing apparatus according to claim 4, wherein a quantization parameter of said first coding means is fixed to a predetermined value.

7. An image processing apparatus according to claim 1, wherein said apparatus is an electronic still camera.

8. An image processing apparatus according to claim 7, wherein each of said first coding means and said second coding means are operated in a continuous photographing mode.

9. An electronic still camera comprising:
first coding means for coding input image data into code data having a variable length;
second coding means for coding input data into code data having a fixed length;
selecting means for selecting said first coding means or said second coding means; and
mode setting means for setting either a single photographing mode or a continuous photographing mode, wherein said selecting means selects said first coding means or said second coding means in accordance with a setting made by said mode setting means.

10. An image processing method comprising the steps of:
coding image data of a first frame into first code data having a variable length;
coding image data of a second fame into second code data having a variable length; and
coding the first code data and the second code data into third code data having a fixed length.

11. An image processing method according to claim 10, wherein the third code data is generated in such a manner that the sum of the amount of the first code data and of the amount of the second code data equals a predetermined amount.

12. An image processing method according to claim 10, wherein the ratio of the amount of a first portion of the third code data, which represents image data of the first frame, and the amount of a second portion of the third code data, which represents image data of the second frame, is the same as the ratio of the amount of the first code data and the amount of the second code data.

13. An image processing apparatus comprising:
first coding means for coding input image data into code data having a variable length;
counting means for counting the amount of code data coded by said first coding means; and
second coding means for decoding the code data coded by said first coding means having a variable length and for decoding the variable length code data into code data having a fixed length when a count value made by the counting means reaches a predetermined value.

14. An image processing apparatus according to claim 13, wherein each of said first coding means and said second coding means performs coding by using orthogonal conversion.

15. An image processing apparatus according to claim 13, wherein each of said first coding means and said second coding means have quantization means for quantizing input data.

16. An image processing apparatus according to claim 15, wherein a quantization parameter of said first coding means and a quantization parameter of said second coding means are different from each other.

17. An image processing apparatus according to claim 15, wherein a quantization parameter of said first coding means is fixed to a predetermined value.

18. An image processing apparatus according to claim 13, wherein said apparatus is an electronic still camera.

19. An image processing apparatus according to claim 18, wherein each of said first coding means and said second coding means are operated in a continuous photographing mode.

20. A still image recording apparatus comprising:
mode setting means for setting either a single recording mode or a continuous recording mode;
first coding means for coding input data into code data having a fixed length when the single recording mode is set by said mode setting means; and
second coding means for coding input data into code data having a variable length when the continuous recording mode is set by said mode setting means.

21. A still image recording apparatus according to claim 20, further comprising third coding means for decoding code data coded by said second coding means having a variable length and for coding the decoded data into code data having a fixed length.

22. A still image recording apparatus according to claim 20, wherein each of said first coding means and said second coding means performs coding by using orthogonal conversion.

23. A still image recording apparatus according to claim 20, wherein each of said first coding means and said second coding means have quantization means for quantizing input data.

24. A still image recording apparatus according to claim 23, wherein a quantization parameter of said first coding means and a quantization parameter of said second coding means are different from each other.

25. A still image recording apparatus according to claim 23, wherein the quantization parameter of said first coding means is fixed to a predetermined value.

* * * * *

UNITED STATES PATENT AND TRADEMARK OFFICE
CERTIFICATE OF CORRECTION

PATENT NO. : 5,216,518
DATED : June 1, 1993
INVENTOR(S) : TAKU YAMAGAMI

It is certified that error appears in the above-indentified patent and that said Letters Patent is hereby corrected as shown below:

TITLE PAGE

[56] REFERENCES CITED
FOREIGN PATENT DOCUMENTS

"0380081  1/1990" should read --0380081  8/1990--.
"02156789  9/1990" should read --2-156789  6/1990--.

COLUMN 4

Line 12, "again encoded" should be deleted.

COLUMN 9

Line 1, "1 Mbytes." should read --1 Mbyte.--.

COLUMN 10

Line 32, "are" should read --is--.
Line 34, "image in" should read --an image in--.
Line 59, "VLC Volume" should read --+ VLC Volume--.
Line 60, "(i) VLC Volume" should be deleted.

COLUMN 11

Line 48, "a" should read --an--.

UNITED STATES PATENT AND TRADEMARK OFFICE
CERTIFICATE OF CORRECTION

PATENT NO. : 5,216,518
DATED : June 1, 1993
INVENTOR(S) : TAKU YAMAGAMI

It is certified that error appears in the above-indentified patent and that said Letters Patent is hereby corrected as shown below:

COLUMN 12

Line 64, "performed" should read --performed,--.

COLUMN 14

Line 1, "a" should be deleted.
Line 27, "Then, the" should read --The--.
Line 41, "values A" should read --values Â--.
Line 66, "time" should read --times--.

COLUMN 15

Line 9, "of is" should read --of Â is--.
Line 26, "Ã" should read --Â--.

COLUMN 16

Line 64, "Then, the" should read --The--.

UNITED STATES PATENT AND TRADEMARK OFFICE
CERTIFICATE OF CORRECTION

PATENT NO. : 5,216,518
DATED : June 1, 1993
INVENTOR(S) : TAKU YAMAGAMI

It is certified that error appears in the above-indentified patent and that said Letters Patent is hereby corrected as shown below:

COLUMN 17

Line 9, "conditions" should read --conditions of--.
Line 12, "above-describe" should read --above-described--.
Line 32, "as well as" should be deleted.
Line 45, "images," should read --images--.

COLUMN 18

Line 47, "1 further" should read --1, further--.

Signed and Sealed this

Tenth Day of May, 1994

BRUCE LEHMAN

Attest:

Attesting Officer

Commissioner of Patents and Trademarks